J. B. MITTEN.
FEED WATER-HEATER.

No. 182,844. Patented Oct. 3, 1876.

WITNESSES:
Francis McArdle
John Goethals

INVENTOR:
J. B. Mitten
BY
ATTORNEYS.

UNITED STATES PATENT OFFICE.

JOHN B. MITTEN, OF PERU, INDIANA.

IMPROVEMENT IN FEED-WATER HEATERS.

Specification forming part of Letters Patent No. 182,844, dated October 3, 1876; application filed July 1, 1876.

*To all whom it may concern:*

Figure 1:
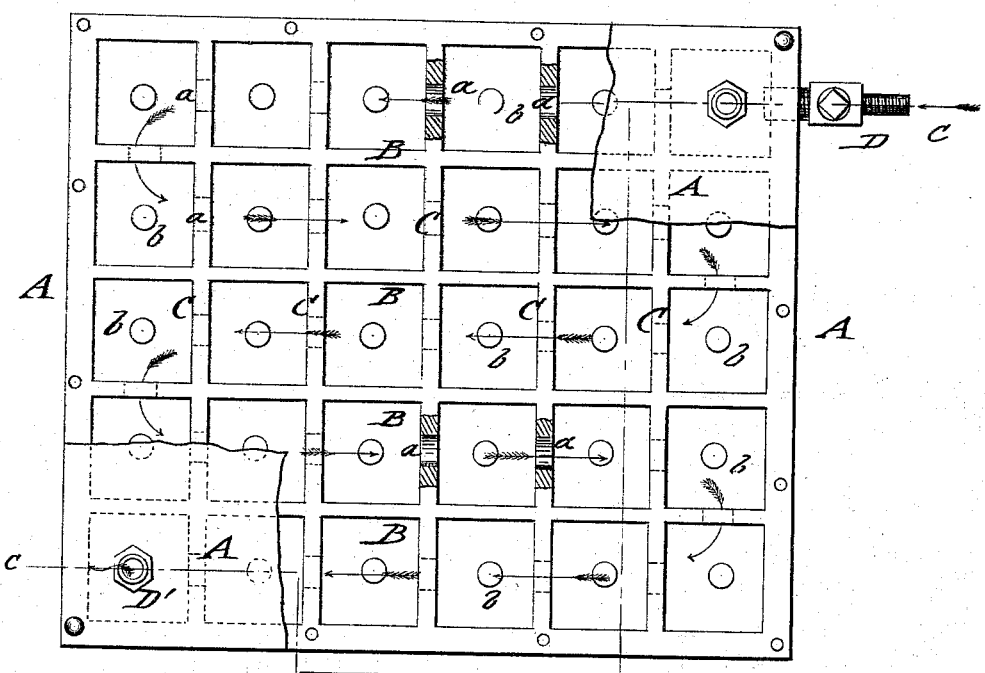
Figure 2:
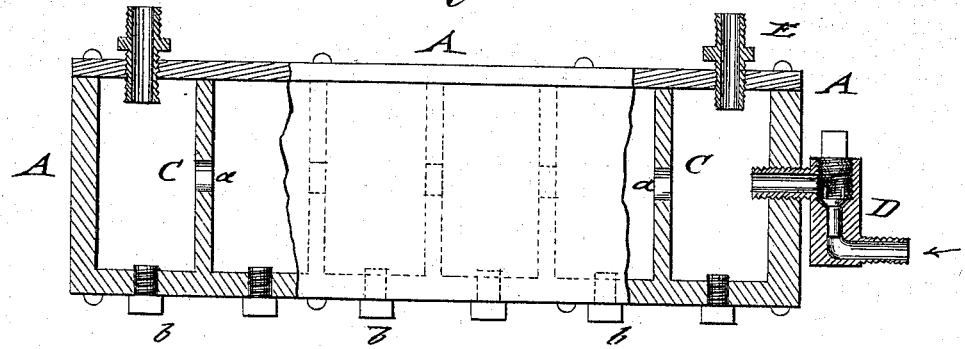

Be it known that I, JOHN B. MITTEN, of Peru, in the county of Miami and State of Indiana, have invented a new and Improved Feed-Water Heater and Purifier, of which the following is a specification:

In the accompanying drawing, Figure 1 represents a top view, partly in section, and Fig. 2 a vertical longitudinal section on the line $c\ c$, Fig. 1, of my improved feed-water heater and purifier.

Similar letters of reference indicate corresponding parts.

The object of my invention is to purify the feed-water of lime and other scale-forming substances in its passage from pump to boiler, so as to prevent incrustation in the boiler; and the invention consists of a series of chambers formed by longitudinal and lateral partition walls, of which the lateral walls have central openings, so that the water is compelled to pass from one longitudinal series of chambers to the next adjoining one, and so on to the boiler.

In the drawing, A represents a casing of suitable size that is divided by longitudinal and lateral partition-walls B and C into a number of chambers. The lateral partition-walls C are provided with openings $a$ near the center, through which the water passes from chamber to chamber to the boiler. The water enters through a pipe, D, with check-valve from the pump at one corner, and leaves the heater to convey the water to the lower part of the boiler by a pipe, D', at the diagonally-opposite corner. The check-valve prevents the water from flowing back into the pump, and compels it to pass consecutively through the first series of chambers, then in opposite direction through the second, and so on to the exit-pipe, as indicated by arrows in Fig. 1. The chambers being deep, and always filled with water, form spaces both above and below the openings or water channels, which serve first to gather the raised scum near the top of the chambers till the same is condensed, and thereby carried down to the bottom of the chambers, where it is then retained in the space below the current of water from pump to boiler. Bottom plugs $b$ of each chamber serve for the purpose of cleaning out the impurities collected on the bottom of the chambers, the water being thus heated and purified in its passage from pump to boiler in a simple and effective manner.

Thus I construct a lime extractor, through which the water passes slowly and deposits lime or other impurities in the bottoms of the chambers B, the water being preferably heated by steam or otherwise, to make the sediment more readily collate and fall by its own gravity.

Hence what I claim is—

A feed-water purifier subdivided into a series of chambers, B, and these connected by apertures $a$ located above their bottoms, the water inlet and outlet being arranged diagonally opposite, while the bottom of each chamber is provided with a detachable plug, as shown and described.

JOHN B. MITTEN.

Witnesses:
F. H. ELVIN,
G. D. YOUNG.